May 29, 1962

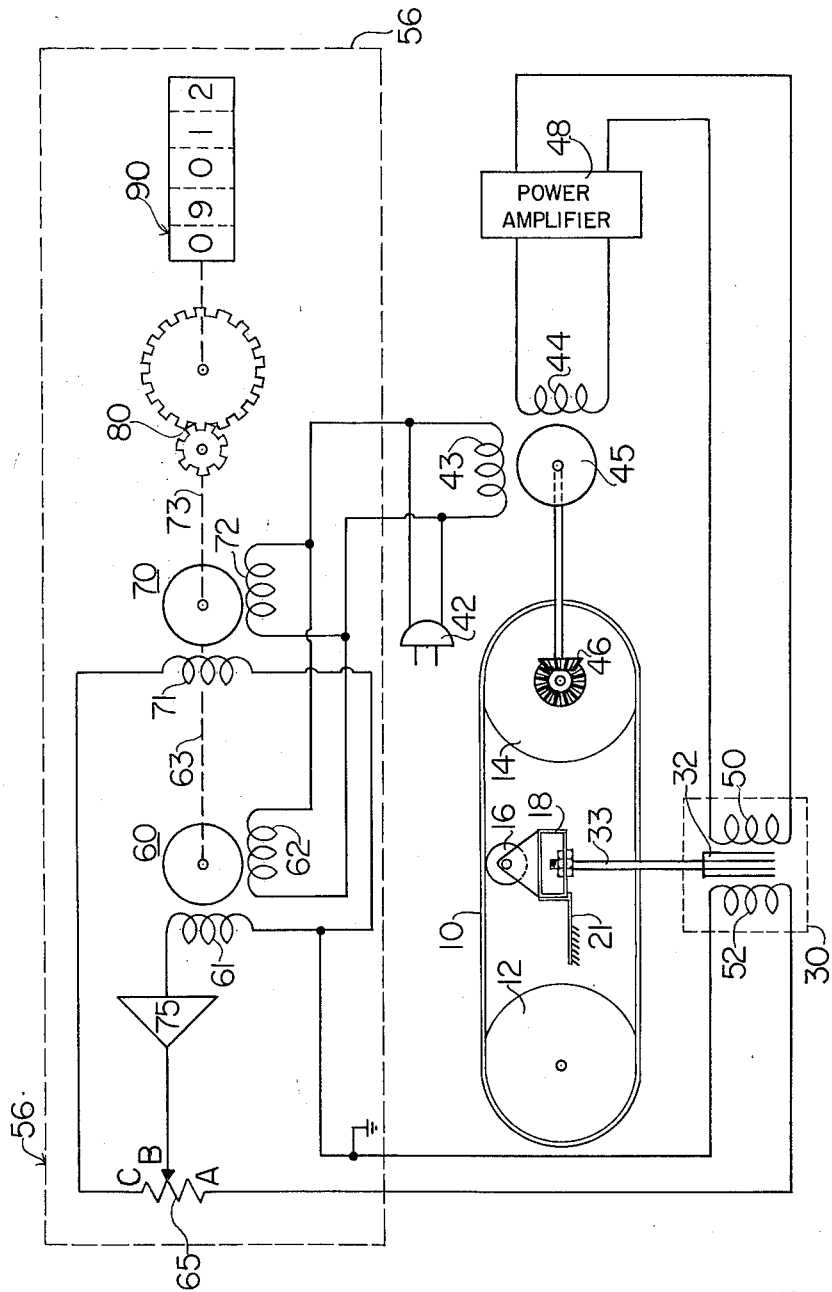

United States Patent Office 3,036,769
Patented May 29, 1962

3,036,769
MATERIAL CONVEYOR
Thomas P. Goslin, Pittsford, and Robert W. Morrison, Clarence, N.Y., assignors, by mesne assignments, to Streeter-Amet Company, Grayslake, Ill., a corporation of Illinois
Filed Dec. 24, 1958, Ser. No. 782,960
5 Claims. (Cl. 235—151)

This invention relates to servomechanisms, and more particularly relates to such mechanisms in combination with measuring means, the combined apparatus comprising an integrating means for use with conveying equipment to measure and integrate the weights and rates of delivery of bulk materials being conveyed, and to provide an indication of the total material delivered, the present apparatus being referred to hereinafter as a weight integrator.

It is a principal object of the invention to provide a servomechanism including a motor having an output shaft, the speed of rotation of which is proportional to the amplitude of an input signal, and said system integrating and continuously presenting an output indication based on the information carried by said input signal.

A more specific object of the invention is to provide apparatus which may be installed on any belt-type conveyor, for example in the manner disclosed in co-pending patent application Serial No. 598,304 filed July 17, 1956 and entitled "Weighing Conveyors." The present novel apparatus measures the instantaneous weights of the load passing a certain point on a conveyor belt, measures the instantaneous rate of travel of the belt, and then integrates these values of weight and rate and provides a visual indication of the integrated total.

The rate of travel of the conveyor belt may be measured by a tachometer generator connected to some moving part of the conveyor belt system, such as one of the rollers by which the belt is driven. The tachometer generator is excited from the power lines and provides an output voltage which is proportional to the speed of the belt. This voltage is amplified and is conducted through the primary and secondary windings of a transformer to the integrating means. This transformer has a movable core section which is supported below the upper run of the conveyor belt by suitable spring means, whereby the coupling in the transformer is made proportional to the deflection of the belt by the weight of the bulk material being carried thereon. Thus, the output of the transformer is made to represent the product of the belt's speed times the weight of the material on the conveyor belt at the point at which such weighing takes place. Integration and indication of the weight-rate product derived from the output of the transformer and the tachometer generator is accomplished by introducing the product of these two signals into a velocity servomechanism. This servomechanism has an output shaft the rotation of which is proportional to the product of the belt deflection and the belt speed, the total angular displacement of the servomechanism being proportional to the integral of this product, or to the total weight of material transported by the belt conveyor during the time in which the integration of this product is performed. A revolution counter attached to the servomechanism output shaft through a suitable gear train provides a convenient method for indicating the totalized weight.

Another important object of the invention is to provide an integrator having a self-compensating tendency, which greatly reduces or eliminates the effect of line voltage fluctuations on the output indication, said integrator employing negative-feedback by which the fluctuations are substantially cancelled.

A further object of the invention is to provide an integrating circuit which may be conveniently located remotely from the conveyor since it is connected to the weight and rate sensing means only by a minimum of wiring and does not require mechanical connections thereto.

Other objects and advantages of the invention will become apparent during the following discussion of the drawing which is a schematic diagram showing the novel servomechanism in combination with a conveyor belt and sensing means associated therewith to determine the integral of the weight transported thereon.

Referring now to the drawing, by way of example, there is illustrated a belt conveyor including an endless belt 10 which runs on end rollers 12 and 14, at least one of which rollers is driven in any suitable manner (not shown). The load-carrying run of the belt 10 passes over a roller 16 which is supported on a frame 18 which is held against displacement longitudinally of the belt, but which frame is free to move vertically up and down with respect to the bottom of the upper run of the belt 10. The manner in which this frame 18 is supported is not shown since it is not important to the present invention, but spring means 21 is provided to urge the roller 16 upwardly into contact with the belt 10. Spring means 21 may be a leaf spring or may comprise a torsion bar system, but in any event the spring means 21 is calibrated in terms of weight of material being moved on the belt 10 and provides a constant modulus of elasticity and low temperature coefficient of expansion.

A transformer 30 is supported on suitable means (not shown) below the frame 18, and includes a movable core section 32 vertically reciprocable in the transformer and connected with a stem 33 which is attached at its upper end to the frame 18, whereby when the roller 16 is deflected up and down on the supporting spring 21, the stem 33 and movable core section 32 are reciprocated within the transformer 30 so as to vary the magnetic coupling between the primary winding 50 and the secondary winding 52. A tachometer generator 45 is coupled through suitable gearing 46 to a moving member of the belt conveyor, such as the roller 14. The generator 45 includes two windings 43 and 44. The winding 43 is connected with an external power line (such as 115 volts 60 cycles) by a suitable plug 42 to energize the tachometer winding 43. Thus, the generator is excited by a power line voltage and produces a voltage output the amplitude of which is proportional to its rotation in a well-known manner, and hence proportional to the speed of the endless belt conveyor. The tachometer generator output voltage is amplified electrically by an amplifier 48 to obtain sufficient power to properly excite the primary winding 50 of the variable transformer 30.

The secondary winding 52 of this transformer produces an output voltage which is proportional to the input to the primary winding 50 as modified by positional changes of the movable core 32, which positional changes depend directly upon the weight of the material being carried by the belt 10. It should thus be apparent that the output of the secondary winding 52 is a function of both the speed of the belt and of the load carried thereby.

The output voltage of the secondary winding is conducted to the input of an integrator 56, said integrator being enclosed by a dashed-line box bearing this reference character.

The integrator 56, comprising the servomechanism, includes a motor 60 having windings 61 and 62, and a generator 70 having windings 71 and 72. The shafts of the motor and of the generator are generally indicated by the reference numerals 63 and 73, and these shafts are coupled together mechanically for unitary rotation. The shafts also are connected through a suitable gear train 80 to a counter 90 for the purpose hereinafter stated.

One motor winding 62 and one generator winding 72 are connected together in parallel, and in turn are excited by the power line, schematically indicated by the plug 42. The integrator 56 also includes an input network 65 comprising a potentiometer having end terminals A and C, and having an adjustable wiper terminal B. The output at the wiper terminal B is conducted to the amplifier 75 which serves the purpose hereinafter stated.

The input signal to the integrator 56 from the secondary winding 52 of the transformer 30 is applied between ground and terminal A of the potentiometer 65 and it is the purpose of the integrator 56 to continuously integrate this signal and provide a display of the integral on the face of the counter 90.

The potentiometer 65 comprises a differential network to which is applied at point A the signal to be integrated, and to which is applied at point C an output signal from the winding 71 of the generator 70, which output represents the actual rate of rotation of the motor 60. When the wiper arm is correctly positioned, the output at B of the potentiometer 65 represents the mathematical difference between the input signal to be integrated and the output signal of the generator 70, so that this difference in signal is actually proportional to the mathematical difference between the signal input at A and the velocity of the motor 60. The gain of the amplifier 75 is adjusted so as to compensate for the effects of friction and other losses in the instrument motor 60 and in the generator 70. The output difference signal at B is thus applied to the motor 60 and serves as a control of the speed of the motor so as to make its velocity closely approach, and for all practical purposes be proportional to, the input signal to be integrated. Thus, the number of revolutions of the shaft of the motor 60 is mathematically proportional to the integral of the motor velocity and thus to the integral of the input signal to A from the transformer 30.

A reduction gearing 80 provides a drive to a standard digital indicator 90 which enables the integrated results to be visually presented based on any suitable calibration of the overall system.

We do not limit our invention to the exact embodiment shown in the drawing, for variations in the system can be made within the scope of the following claims.

We claim:

1. A weight integrator for use with a conveyor having a weigher, comprising tachometer means, means driving the tachometer means at a speed proportional to the speed of the conveyor whereby it will deliver a voltage proportional to the rate of travel of the material on the conveyor; current translating means connected to said tachometer means to receive said current, the translating means being linked to said weigher and varied thereby to deliver a signal which varies both with the rate of travel of the materials and with their instantaneous weights; an electric motor having a shaft and having at least one winding; a generator having a shaft coupled for rotation with the motor shaft and having at least one generator winding; shaft rotation sensitive means connected with said shafts and integrating angular displacements thereof; and a difference network connected to receive said signal and connected to the generator winding to receive the output therefrom and subtract it from said signal to produce a difference signal; and an amplifier connected to said network and applying the difference signal after amplification to said motor winding.

2. In an integrator as set forth in claim 1, said difference network comprising a potentiometer having a wiper contact connected to said amplifier, and having one end of the potentiometer connected to said generator winding and the other end of the potentiometer connected to receive said signal.

3. In an integrator as set forth in claim 1, said translating means comprising a transformer receiving said current in a primary winding and delivering said signal at a secondary winding, and a core having its air gap varied by said weigher.

4. An integrator for receiving and integrating an input signal, comprising an electric motor having a shaft and having at least one winding, a generator having a shaft coupled for rotation with the motor shaft and having at least one generator winding, shaft rotation counting means connected with said shafts and counting rotations thereof, and a difference network connecting the input signal across the motor and generator windings in parallel to subtract the generator voltage from said input signal to produce a difference signal, adjusting means in the difference network to vary the relative values of the signal and generator voltages and an amplifier connected to said network and applying the difference signal after amplification to said motor winding.

5. In an integrator as set forth in claim 4, said adjusting means comprising a potentiometer having a wiper contact connected to said amplifier, and having one end of the potentiometer connected to said generator winding and the other end of the potentiometer connected to receive said input signal.

References Cited in the file of this patent

UNITED STATES PATENTS

| | | |
|---|---|---|
| 2,758,830 | Bentley | Aug. 14, 1956 |
| 2,882,036 | Lyons | Apr. 14, 1959 |
| 2,913,146 | Dickerson | Nov. 17, 1959 |
| 2,934,751 | MacGeorge | Apr. 26, 1960 |
| 2,967,018 | Fogarty | Jan. 3, 1961 |

OTHER REFERENCES

"Servomechanism Practice" (Ahrendt), published by McGraw-Hill (New York), 1954 (pages 115 and 116 relied on).

The Review of Scientific Instruments, vol. 21, No. 3, March 1950, pp. 228–231 ("An Analog Computer," by J. G. Bayly).